(12) United States Patent
Park et al.

(10) Patent No.: US 11,171,332 B2
(45) Date of Patent: Nov. 9, 2021

(54) SILICON-BASED ACTIVE MATERIAL PARTICLES FOR SECONDARY BATTERY AND METHOD FOR PRODUCING SAME

(71) Applicant: NEXEON LTD., Oxfordshire (GB)

(72) Inventors: Seung Chul Park, Daejeon (KR); Eui Joon Song, Daejeon (KR); Min Young Cheong, Anyang-si (KR); Jong Hun Lee, Daejeon (KR); Young Tai Cho, Daejeon (KR); Yong Gil Choi, Daejeon (KR); Seon Park, Daejeon (KR); Sung Hwan Kang, Jinju-si (KR); Hee Young Seo, Daejeon (KR); Jee Hye Park, Daejeon (KR); Tae Jin Yang, Daejeon (KR)

(73) Assignee: Nexeon Ltd., Abingdon (GB)

( * ) Notice: Subject to any disclaimer, the term of this patent is extended or adjusted under 35 U.S.C. 154(b) by 339 days.

(21) Appl. No.: 16/326,672

(22) PCT Filed: Aug. 23, 2017

(86) PCT No.: PCT/KR2017/009223
§ 371 (c)(1),
(2) Date: Feb. 19, 2019

(87) PCT Pub. No.: WO2018/038538
PCT Pub. Date: Mar. 1, 2019

(65) Prior Publication Data
US 2019/0190020 A1 Jun. 20, 2019

(30) Foreign Application Priority Data
Aug. 23, 2016 (KR) .................. 10-2016-0106853

(51) Int. Cl.
*H01M 4/38* (2006.01)
*H01M 4/04* (2006.01)
(Continued)

(52) U.S. Cl.
CPC ........... *H01M 4/386* (2013.01); *C01B 33/021* (2013.01); *H01M 4/043* (2013.01);
(Continued)

(58) Field of Classification Search
None
See application file for complete search history.

(56) References Cited

U.S. PATENT DOCUMENTS

| 7,879,734 B2 | 2/2011 | Fukutani et al. |
| 8,772,174 B2 | 7/2014 | Green et al. |

(Continued)

FOREIGN PATENT DOCUMENTS

| CN | 103 633 295 A | 3/2014 |
| EP | 2873646 A1 | 5/2015 |

(Continued)

OTHER PUBLICATIONS

International Search Report, International Application No. PCT/KR2017/009223, issued by ISA/KR Korean Intellectual Property Office, 2 pages, dated Dec. 12, 2017.

(Continued)

*Primary Examiner* — Joseph D Anthony
(74) *Attorney, Agent, or Firm* — Choate, Hall & Stewart LLP; William R. Haulbrook; Michael D. Schmitt (57) ABSTRACT

The present invention relates to a method for producing silicon-based active material particles for a secondary battery and silicon-based active material particles. A method for producing silicon-based active material particles for a secondary battery according to an embodiment of the present invention may comprise: a step of providing silicon powder; a step of providing a pre-pulverization mixture in which the silicon powder is dispersed in a solvent for dispersion comprising an antioxidant; a step of applying mechanical compression and shear stress to the silicon powder of the (Continued)

pre-pulverization mixture to refine the silicon powder, thereby forming silicon particles having an oxygen content controlled by the antioxidant; and a step of drying the resulting material comprising the silicon particles to obtain silicon-based active material particles.

10 Claims, 3 Drawing Sheets

(51) Int. Cl.
    *H01M 4/134* (2010.01)
    *H01M 4/36* (2006.01)
    *C01B 33/021* (2006.01)

(52) U.S. Cl.
    CPC ......... *H01M 4/0471* (2013.01); *H01M 4/134* (2013.01); *H01M 4/36* (2013.01); *H01M 4/38* (2013.01)

(56) References Cited

U.S. PATENT DOCUMENTS

| | | |
|---|---|---|
| 9,243,144 B2 * | 1/2016 | Canham .................. A61K 8/11 |
| 9,774,031 B2 | 9/2017 | Yoo et al. |
| 10,008,716 B2 | 6/2018 | Abdelsalam et al. |
| 10,077,506 B2 | 9/2018 | Friend et al. |
| 10,090,513 B2 | 10/2018 | Canham et al. |
| 10,103,379 B2 | 10/2018 | Macklin et al. |
| 10,164,257 B2 | 12/2018 | Otsuka et al. |
| 10,388,948 B2 | 8/2019 | Abdelsalam et al. |
| 10,396,355 B2 | 8/2019 | Cho et al. |
| 10,476,072 B2 | 11/2019 | Friend et al. |
| 2003/0089884 A1 * | 5/2003 | Nakazawa ............ A23L 3/3436 252/181.1 |
| 2005/0233213 A1 | 10/2005 | Lee et al. |
| 2006/0040182 A1 * | 2/2006 | Kawakami .......... H01M 10/052 429/218.1 |
| 2006/0102473 A1 | 5/2006 | Bito et al. |
| 2006/0147802 A1 | 7/2006 | Yasuda et al. |
| 2008/0090152 A1 | 4/2008 | Kosuzu et al. |
| 2009/0010833 A1 | 1/2009 | Rosenband et al. |
| 2009/0061322 A1 * | 3/2009 | Kawakami .......... H01M 10/052 429/231.95 |
| 2010/0009261 A1 | 1/2010 | Watanabe |
| 2010/0178565 A1 | 7/2010 | Green |
| 2010/0190061 A1 | 7/2010 | Green |
| 2010/0196760 A1 | 8/2010 | Green |
| 2010/0288970 A1 | 11/2010 | Watanabe et al. |
| 2011/0236493 A1 * | 9/2011 | Canham ................. A23P 10/30 424/491 |
| 2013/0136986 A1 | 5/2013 | Scoyer et al. |
| 2013/0216907 A1 | 8/2013 | Rayner et al. |
| 2013/0266865 A1 | 10/2013 | Kwon et al. |
| 2014/0106230 A1 | 4/2014 | Kim et al. |
| 2014/0162131 A1 | 6/2014 | Friend et al. |
| 2014/0346436 A1 * | 11/2014 | Li ....................... H01L 31/0682 257/9 |
| 2015/0037673 A1 | 2/2015 | Zaghib et al. |
| 2015/0044571 A1 | 2/2015 | Abdelsalam et al. |
| 2015/0221936 A1 | 8/2015 | Huang |
| 2015/0303456 A1 | 10/2015 | Yoo et al. |
| 2016/0126538 A1 * | 5/2016 | Hanelt ............... H01M 10/0525 429/213 |
| 2016/0197342 A1 | 7/2016 | Lee et al. |
| 2016/0308205 A1 | 10/2016 | Canham et al. |
| 2017/0033357 A1 | 2/2017 | Cho et al. |
| 2017/0040610 A1 | 2/2017 | Otsuka et al. |
| 2017/0047580 A1 | 2/2017 | Cho et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0346079 A1 | 11/2017 | Friend et al. |
| 2017/0352883 A1 | 12/2017 | Cho et al. |
| 2018/0034056 A1 | 2/2018 | Cho et al. |
| 2018/0069234 A1 | 3/2018 | Friend et al. |
| 2018/0083263 A1 | 3/2018 | Cho et al. |
| 2019/0119826 A1 | 4/2019 | Friend et al. |
| 2019/0148718 A1 | 5/2019 | Hatazawa et al. |
| 2019/0198869 A1 | 6/2019 | Park et al. |

FOREIGN PATENT DOCUMENTS

| | | |
|---|---|---|
| EP | 2533331 B1 | 8/2015 |
| EP | 2900596 | 8/2015 |
| EP | 2966037 A1 | 1/2016 |
| JP | 2004-311429 A | 11/2004 |
| KR | 2012-0093756 A | 8/2012 |
| KR | 2012-0120034 A | 11/2012 |
| KR | 2013-0114007 A | 10/2013 |
| KR | 2013-0139554 A | 12/2013 |
| WO | WO-2004/086539 A1 | 10/2004 |
| WO | WO-2016/085953 A1 | 6/2016 |
| WO | WO-2016/174023 A1 | 11/2016 |

OTHER PUBLICATIONS

Su, L. et al., Core Double-shell Si@SiO2@C nanocomposites as anode materials for Li-ion batteries, Chemical Communication, 46:2590-2592 (2010).

Xu, R. et al., Comparison of sizing small particles using different technologies, Powder Technology, 132:145-153, (2003).

* cited by examiner

SILICON-BASED ACTIVE MATERIAL PARTICLES FOR SECONDARY BATTERY AND METHOD FOR PRODUCING SAME

FIELD OF THE INVENTION

The present invention relates to a secondary battery technology, and more particularly, to a silicon-based negative electrode active material and a method for producing same.

BACKGROUND TECHNOLOGY

A secondary battery is a battery that can be charged and discharged using an electrode material having excellent reversibility, and a typical commercialized example thereof is a lithium secondary battery. The lithium secondary battery is expected to be applied as a medium/large-sized power source mounted on a transportation means (e.g. automobiles) or used for power storage of a power supply network (e.g. smart grid), as well as a compact power source for small IT devices (e.g. smart phones, portable computers, and electronic paper).

When lithium metal is used as a negative electrode material of a lithium secondary battery, there is a risk that a short-circuit or explosion of the battery may occur due to formation of a dendrite. Therefore, instead of lithium metal, crystalline carbon (e.g. graphite and artificial graphite), soft carbon, hard carbon, and carbon-based active materials to which lithium can be intercalated and deintercalated, are widely used. However, with the expansion of the applications of the secondary battery, there is an increasing demand for higher capacity and higher output from a secondary battery. Accordingly, non-carbon negative electrode materials having a capacity of 500 mAh/g or greater (e.g. silicon (Si), tin (Sn), or aluminum (Al)), which can replace carbon-based negative electrode materials having a theoretical capacity of 372 mAh/g and can be alloyed with lithium, are receiving attention.

Among these non-carbon negative electrode materials, silicon has the largest theoretical capacity of about 4,200 mAh/g, and thus the commercialization of silicon is very important in terms of capacity. However, the volume of silicon when charged increases by about four times compared to the volume when discharged, and thus, the electrical connection between active materials and the electrical connection between a current collector and the active materials may be destroyed due to the volume change during charging and discharging, and the progress of an irreversible reaction (e.g. formation of a solid electrolyte interface (SEI) layer (e.g. $Li_2O$)) due to corrosion of the active material by the electrolyte, and subsequent deterioration in lifetime is a major obstacle to commercialization.

While many conventional methods have been proposed to achieve a relatively high capacity battery with minimized volume expansion and shrinkage of an active material to improve the lifetime, the most commercially feasible method is to make silicon particles into nano particles. However, even in the cases of nano-sized silicon particles, these nano-sized silicon particles did not meet the standards for commercialization because of the micronization of the particles due to repeated volume expansion/shrinkage, even to a small extent, and subsequent rapid deterioration of the lifetime. Therefore, for commercialization of silicon materials, it is necessary to design particles capable of maximizing the capacity of a battery while suppressing volume change during charging/discharging, and a manufacturing technique thereof.

DETAILED DESCRIPTION OF THE INVENTION

Technical Problem

Accordingly, a technical problem to be solved in the present invention is the provision of a method for preparing silicon-based active material particles having a long lifetime by improving energy density by improving irreversible capacity and reducing changes in volume according to charging/discharging, by using a silicon-based material.

Additionally, another technical problem to be solved in the present invention is the provision of silicon-based active material particles having the advantages described above.

Technical Solution

To solve the above problems, the method for preparing silicon-based active material particles according to an embodiment of the present invention includes a step of providing silicon powder; a step of providing a pre-pulverization mixture, in which the silicon powder is dispersed in a solvent for dispersion containing an antioxidant; a step of applying mechanical compression and shear stress to the silicon powder of the pre-pulverization mixture to granulate the silicon powder, thereby forming silicon particles having an oxygen content controlled by the antioxidant; and a step of drying the resulting material containing the silicon particles to obtain silicon-based active material particles.

In an embodiment, the antioxidant may be selected from the group consisting of alpha lipoic acid, octene, propyl gallate, tocopherol, glutathione, butyl hydroxyanisole, butylated hydroxytoluene, tertiary butyl hydroquinone, nordihydroguaiaretic acid, sesamol, vitamin E, vitamin C, and quercetin. In another embodiment, the antioxidant may include alpha lipoic acid or octene.

In an embodiment, the antioxidant may be used in an amount of 1 wt % to 10 wt % relative to the weight of the silicon powder. The solvent for dispersion may further include water, deionized water, an alcoholic solvent, or a mixture of two or more thereof.

In an embodiment, the alcoholic solvent may include any one selected from the group consisting of ethyl alcohol, methyl alcohol, glycerol, propylene glycol, isopropyl alcohol, isobutyl alcohol, polyvinyl alcohol, cyclohexanol, octyl alcohol, decanol, hexadecanol, ethylene glycol, 1,2-octanediol, 1,2-dodecanediol, and 1,2-hexadecanediol, or a mixture thereof.

In an embodiment, the step of applying mechanical compression and shear stress may be performed by a mill pulverization process using a composition of abrasive particles along with the solvent for dispersion.

To solve the above problems, the silicon-based active material particles according to an embodiment of the present invention may be silicon-based active material particles which include a core of the silicon particle and a chemical oxide layer formed on the core of the silicon particle, and the oxygen content relative to the total weight of the silicon-based active material particles may be limited to the range of 6 wt % to 10 wt %.

In an embodiment, the silicon-based active material particles may be formed by a pre-pulverization mixture, which is dispersed in a solvent for dispersion that includes silicon powder and an antioxidant, and the oxygen content may be controlled by the weight of the antioxidant relative to the weight of the silicon powder.

Advantageous Effects of the Invention

According to an embodiment of the present invention, a method for preparing silicon-based active material particles may be provided, wherein during the preparation of the silicon-based particles excessive expansion of the core of the silicon particle during charging/discharging of the battery is prevented and subsequent micronization is prevented while stable formation of solid electrolyte interface (SEI) is induced, by controlling the oxygen content within the silicon particle by providing a pre-pulverization mixture, in which silicon powder is dispersed in a solvent for dispersion that includes an antioxidant, thus contributing to the improvement of the lifetime of the silicon-based active material particles.

Additionally, the formation of an oxide film may be controlled by a solvent for dispersion used in the process of granulating the silicon powder. As a result, a method for preparing a silicon-based active material particle with a long lifetime may be provided, by reducing the oxygen content in the active material and thereby improving the initial capacity of the battery and the battery efficiency.

BEST MODE FOR CARRYING OUT THE INVENTION

Hereinafter, preferred embodiments of the present invention will be described in detail with reference to accompanying drawings.

Examples of the present invention are provided to more fully describe the present invention to those skilled in the art. The following Examples may be modified in various ways, but the scope of the present invention is not limited to these Examples described hereinbelow. Rather, these Examples are provided so that the present disclosure will be more faithful and complete and fully convey the spirit of the present invention to those skilled in the art.

Additionally, in the drawings, thickness and size of each layer are exaggerated for convenience and clarity of explanation, and the same reference numerals refer to the same elements in the drawings. As used herein, the term "and/or" includes any and all combinations of any of listed items.

The terminology used herein is used for the purpose of describing particular embodiments and is not intended to limit the invention. As used herein, the singular forms may include the plural forms as well, unless the context explicitly indicates otherwise. Additionally, it is apparent that the terms "comprise" and/or "comprising," when used in this specification, specify the presence of stated features, integers, steps, operations, members, components, and/or groups thereof, but do not exclude the presence or addition of one or more other features, integers, steps, operations, members, components, and/or groups thereof.

Figure 1A:
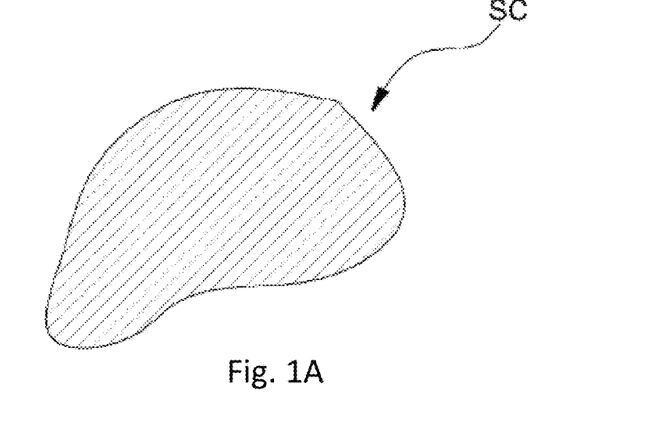
FIGS. 1A and 1B are cross-sectional views showing various shapes of granulated silicon particles according to various embodiments of the present invention.
Figure 1B:
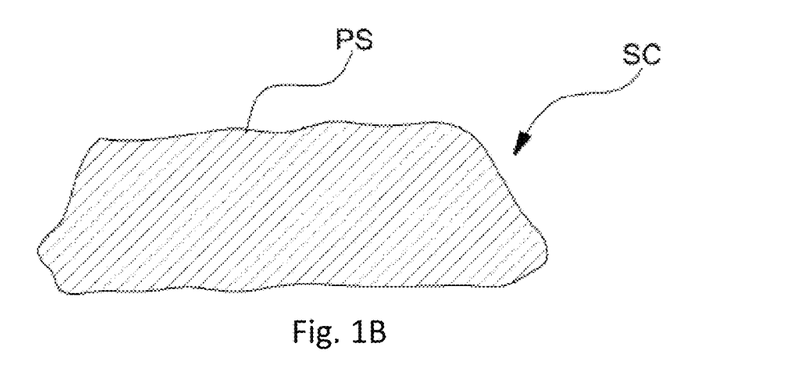
Figure 2:
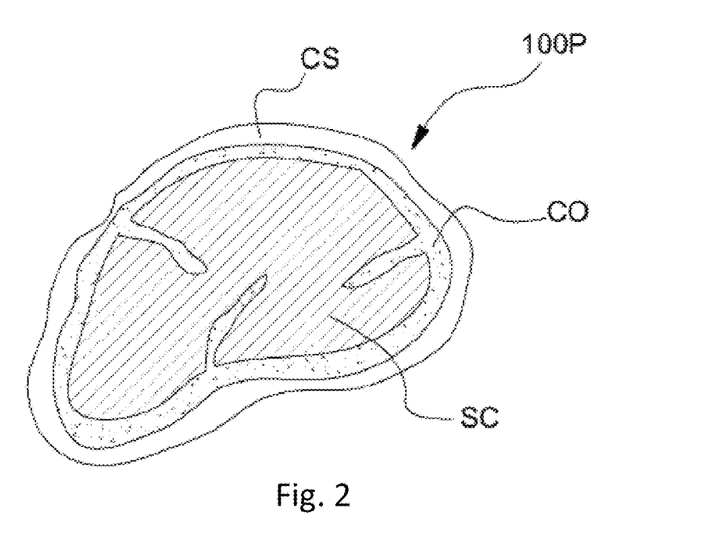
FIG. 2 is a cross-sectional view showing the shape of silicon particles with one or more additional layers formed on the core of the silicon particles of FIG. 1A.

FIGS. 1A and 1B are cross-sectional views showing various shapes of granulated silicon particles (SC) according to various embodiments of the present invention, and FIG. 2 is a cross-sectional view showing the shape of silicon-based active material particles (100P) with one or more additional layers formed on the core of the silicon particles (SC) of FIG. 1A.

The granulated silicon particles (SC) have a potato shape as shown in FIG. 1A, or a flake-type irregular shape with a planar surface (PS) as shown in FIG. 1B. Silicon particles (SC) having such irregular shapes are granulated particles or finely granulated particles formed by mechanical compression and shear stress applied to the granulated silicon powder, as produced by the method described later.

The silicon particles (SC) finely granulated by mechanical compression and shear stress may be in the form of irregular particles. Additionally, due to the stress, the finely granulated silicon particles formed together with the chemical oxide may have low crystallinity or easily be amorphous particles having no crystal domains of several tens of nanometers or more. When the size of mechanical compression and shear stress are too small, finely granulated silicon particles will have large crystal domains of tens of nanometers or more. Additionally, when the mechanical compression and shear stress are too large, the silicon particles are micronized and sufficient capacity as the active material cannot be obtained, and thus stress control in the pulverizing method is required.

The grain-type particles shown in FIGS. 1A and 1B in connection with the amorphous silicon particles (SC) are exemplary. In another embodiment, the silicon particles of the present invention may be particles having irregular cross-sectional shapes perpendicular to the axial direction even in a hollow tube structure or a fiber structure. The planar surfaces (PS) of the silicon particles (SC) may be the dominant surfaces among all of the outer surfaces of the silicon particles (SC), in which the dominant surface may be a {110} surface. Quantitatively, the area of the {110} surface of the silicon particles (SC) may be larger than the area of other {100} surfaces and the area of {111} surfaces.

The average particle diameter of the silicon-based active material particles (100P) may be in the range of 30 nm to 300 nm, and preferably the silicon-based active material particles have an average particle diameter in the range of 30 nm to 200 nm. When the average diameter of the silicon-based active material particles (100P) is less than 30 nm, the relative proportion of the conductive layer or the conductive material in particle form in the active material slurry becomes large and thus the battery capacity deteriorates, whereas when the average diameter of the particle exceeds 300 nm, there is a problem in that amorphization to minimize the surface energy is difficult.

The silicon-based active material particles (100P) according to an embodiment of the present invention, as shown in FIG. 2, may include a chemical oxide layer (CO) formed on the core of silicon particles (SC). The chemical oxide layer (CO) may be a silicon oxide layer formed at a low temperature by a solvent for dispersion, which includes an antioxidant in a liquid state in the presence of when under mechanical compression and shear stress, as described below. The oxygen content of the silicon particles (SC) may be controlled depending on the content of the antioxidant. For example, as the content of the antioxidant increases, the formation of the silicon oxide layer on the core of the silicon particles (SC) is controlled in an inversely proportional manner, and thus the oxygen content of silicon particles (SC) may be reduced. The thickness of the chemical oxidation layer (CO) may be in the range of a few nanometers to a few tens of nanometers, and preferably in the range of 3 nm to 15 nm. The chemical oxidation layer (CO) may be formed on the cores of the silicon particles (SC) as shown, the chemical oxidation layer (CO) may grow even inside the cores of silicon particles (SC) due to the diffusion of oxygen or cracks from stress.

In the silicon-based active material particles (100P), the oxygen content relative to the total weight of the cores of silicon particles (SC) and the chemical oxide layer (CO) may be in the range of 5 wt % to 15 wt %, and preferably 6 wt % to 10 wt %. Since the initial charging rate and the capacity retention characteristics are both maintained at 75% or greater within the oxygen content range, silicon-based active material particles suitable for commercialization may be provided. When the oxygen content exceeds 10 wt %, there is a problem in that the initial charging rate is reduced to 75% or less, whereas when the oxygen content is less than 6 wt %, a chemical oxide layer may not be formed to have an appropriate thickness, thereby attenuating the charging/discharging efficiency of the silicon particles.

In an embodiment, the oxygen content may be measured using an infrared detection technique using a commercial element analyzer (ELTRA ONH-2000). Specifically, the oxygen contained in a sample is converted to carbon dioxide using the sample (2 mg to 10 mg), a calorie of 8 kW, and helium (purity of 99.995%) as a carrier gas, and the amount of oxygen can be quantified by measuring the amount of the carbon dioxide generated. The method of measuring the oxygen content using the element analyzer (ELTRA ONH-2000) is only one example, and the measurement method is not limited thereto.

The chemical oxide layer (CO) has an advantage over the silicon oxide layer formed by a conventional thermal oxidation process or thin-film deposition process (e.g. a chemical vapor deposition process) in that the chemical oxide layer (CO) can form a stable phase with minimal influence on the crystal structures of the silicon particles. Generally, in cases of thermal oxidation and chemical vapor deposition, a high processing temperature hinders amorphization of silicon particles. However, since the chemical oxide layer (CO) can be formed at a low temperature and may be formed under high compression and shear stress, a silicon oxide layer may be formed while pursuing granulation of the silicon particles (SC) and, selectively, amorphization of the silicon particles (SC). As a result, the charging/discharging efficiency of the silicon particles may be improved and lifetime thereof may be increased. The degree of irregularity of the silicon-based active material particles (100P) may be determined by the shape of the cores of the inner silicon particles (SC) and may depend on the compressive stress and the shear stress of the granulation process.

In some embodiments, since the chemical oxide layer (CO) of the silicon-based active material particles (100P) is electrically insulative, a conductive layer (CS) may be further formed on the outermost portions of the silicon-based active material particles (100P) so as to reduce contact resistance between the silicon-based active material particles (100P) and to secure an electron movement path. The conductive layer (CS) may include a carbon-based conductive layer (e.g. a graphite layer, a soft carbon layer, or a graphene layer). Additionally, the conductive layer (CS) may be nanoscale particles of conductive metal oxides (e.g. antimony zinc oxide or antimony tin oxide) or layers including the same.

Figure 3:
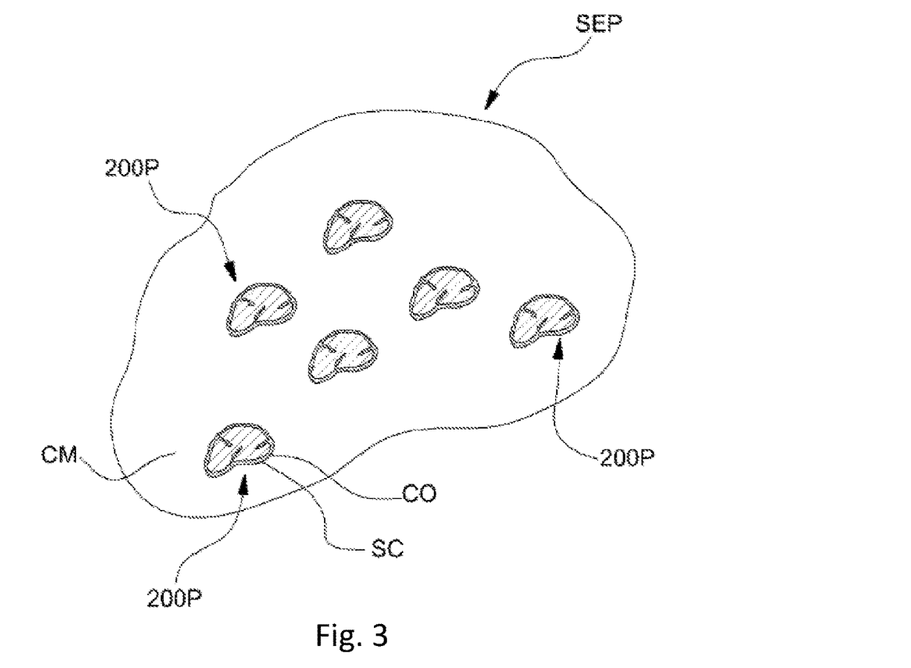
FIG. 3 is a cross-sectional view showing the shape of silicon-based active material particles including the silicon particles of FIG. 1A.

FIG. 3 is a cross-sectional view showing the shape of silicon-based active material complex including the silicon particles of FIG. 1A.

Referring to FIG. 3, the silicon-based active material complex (SEP) may include a carbon matrix (CM), and at least one silicon-based active material particles (200P) dispersed in a carbon matrix (CM). The silicon-based active material particles (200P) may include cores of silicon particles (SC) and a chemical oxide layer (CO) formed on the cores of silicon particles (SC).

In an embodiment, the silicon-based active material complex (SEP) may be comprised of secondary particles, including at least one silicon-based active material particles (200P). The average particle diameter of the silicon-based active material complex (SEP) may be in the range of 1 µm to 10 µm.

The carbon matrix (CM) is for the electrical connection between the silicon-based active material particles (200P) that are in contact with each other and can reduce the internal resistance to the current collector (not shown). In an embodiment, the carbon matrix (CM) may be crystalline or an at least partially amorphous carbon film.

In an embodiment, the carbon matrix (CM) may include graphite, soft carbon, or graphene. When the carbon matrix (CM) has high crystallinity as in graphite, the carbon matrix (CM) may cause a reaction with an electrolyte, and thus, low crystallinity or amorphous carbon film having chemical resistance may be used.

Additionally, the carbon matrix (CM) may have a mixture of a conductive SP2 graphite structure and an insulating SP3 diamond structure. For the carbon matrix (CM) to have conductivity, the SP2 graphite structure may have a larger mole fraction than the SP3 diamond structure, which may be controlled via a heat treatment process.

The silicon-based active material particles (200P) may be comprised of primary particles. In an embodiment, the average particle diameter of the silicon-based active material particles (200P) may be in the range of 30 nm to 300 nm, and preferably, the silicon-based active material particles have an average particle diameter in the range of 30 nm to 200 nm. When the average diameter of the silicon-based active material particles (200P) is less than 30 nm, the relative proportion of the conductive layer or the conductive material in particle form in the active material slurry becomes large and thus the battery capacity deteriorates, whereas when the average diameter of the particle exceeds 300 nm, there is a problem in that amorphization to minimize the surface energy is difficult.

In an embodiment, the silicon particles (SC) of the silicon-based active material particles (200P) may correspond to the silicon particles (SC) shown in FIG. 1A or the silicon particles (SC) shown in FIG. 1B. The above-described silicon particles are exemplary, and the present invention is not limited thereto.

Figure 4:
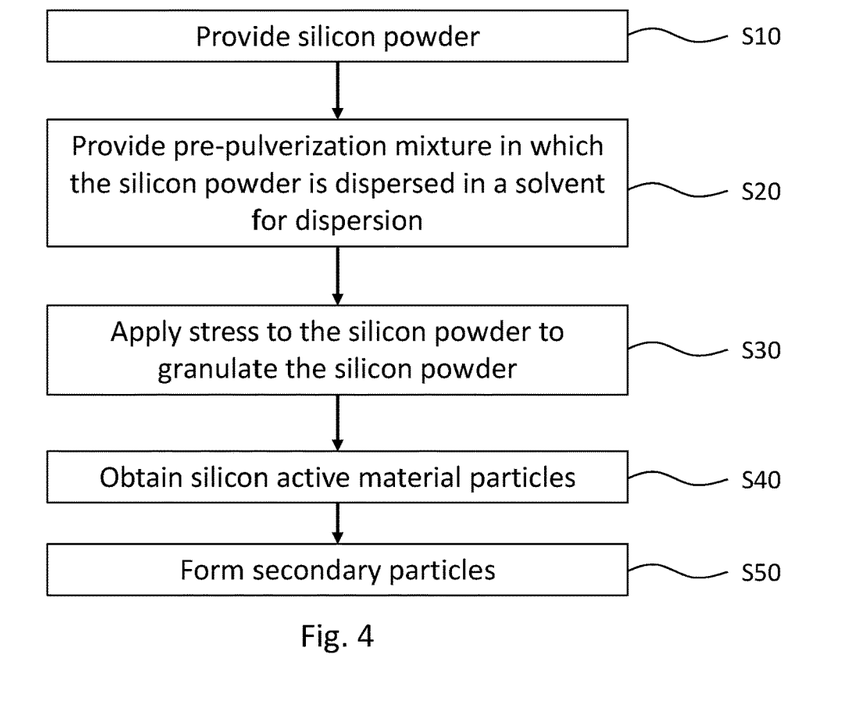
FIG. 4 is a flow chart showing a method of preparing silicon-based active material particles according to an embodiment of the present invention.

FIG. 4 is a flow chart showing a method of preparing silicon-based active material particles according to an embodiment of the present invention.

Referring to FIG. 4, first, silicon powder is prepared (S10). The silicon powder is commercially available granulated particles having an average diameter in the range of a few micrometers to a few thousand micrometers. The silicon powder may be polycrystalline or a single crystal, but the present invention is not limited thereto.

A pre-pulverization mixture in which the silicon powder is dispersed in a solvent for dispersion in a liquid state containing an antioxidant is provided (S20). In an embodiment, as the solvent for dispersion, a solvent containing an antioxidant may be used so as to control the oxygen content of the silicon. In an embodiment, the antioxidant may include alpha lipoic acid, octene, propyl gallate, tocopherol, glutathione, butyl hydroxyanisole (butylated hydroxyl anisole), butylated hydroxytoluene, tertiary butyl hydroquinone, nordihydroguaiaretic acid, sesamol, vitamin E, vitamin C, and quercetin.

In an embodiment, the antioxidant may be used in an amount of 1 wt % to 10 wt % relative to the weight of the silicon powder. For example, when the antioxidant is used in an amount less than 1 wt % relative to the weight of the silicon powder, the amount of oxygen contained in the silicon-based active material particles may be excessive and thereby the irreversible capacity may be increased. When the antioxidant is used in an amount greater than 10 wt % relative to the weight of the silicon powder, a chemical oxide layer (CO) is barely formed and thus it is difficult to suppress the volume expansion of the silicon-based active material particles thereby resulting in a drastic deterioration of the lifetime of the battery. Accordingly, it is preferred that the antioxidant be used in an amount of 1 wt % to 10 wt % relative to the weight of the silicon powder.

The solvent for dispersion may further include water, deionized water, an alcoholic solvent, or a mixture of two or more thereof. The alcoholic solvent may be at least one selected from the group consisting of ethyl alcohol, methyl alcohol, glycerol, propylene glycol, isopropyl alcohol, isobutyl alcohol, polyvinyl alcohol, cyclohexanol, octyl alcohol, decanol, hexadecanol, ethylene glycol, 1,2-octanediol, 1,2-dodecanediol, and 1,2-hexadecanediol, and a mixture thereof. Preferably, the alcoholic solvent is ethyl alcohol.

Mechanical compression and shear stress are applied to the silicon powder of the pre-pulverization mixture to granulate the silicon powder and thereby the silicon particles that will be be the cores of the silicon-based active material particles are formed (S30). Such a granulation process is efficient in preparing amorphous silicon particles.

In an embodiment, the application of mechanical compression and shear stress to the silicon powder may be achieved by grinding, which performs pressing and abrasion while supplying the pre-pulverization mixture between a spinning abrasive plate and a fixed plate. In another embodiment, the application of mechanical compression and shear stress to the silicon powder may be performed by a milling method, in which the pre-pulverization mixture and abrasive particles are charged into a cylindrical or conical container rotating about a central axis and rotated. The abrasive particles may be beads including ceramic particles, metal particles, or a mixture thereof, but the present invention is not limited thereto. The abrasive particles may apply mechanical compression and shear stress to the silicon powder by having an appropriate average size relative to the size of the silicon powder.

In an embodiment, the silicon-based active material particles may be formed from the granulated silicon particles while simultaneously applying the mechanical compression and shear stress. In an embodiment, a chemical oxide layer may be further formed on the granulated silicon particles. As described above, the chemical oxide layer may include a silicon oxide. The thickness of the chemical oxidation layer may be in the range of 2 nm to 30 nm, and preferably in the range of 3 nm to 15 nm.

In the silicon-based active material particles (see 100P of FIG. 2), the oxygen content relative to the total weight of the cores of the silicon particles (SC) and a chemical oxide layer (CO) may be in the range of 5 wt % to 15 wt %, and preferably 6 wt % to 10 wt %. When the initial charging rate and the capacity retention characteristics are both maintained at 75% or greater within the above range of oxygen content, a silicon-based active material complex suitable for commercialization may be provided.

Then, silicon complex particles may be obtained by drying the resulting product including the silicon-based active material particles (S40). Preferably, a subsequent step such as a sorting step for scrubbing the obtained silicon complex particles may be further performed.

The silicon-based secondary active material particles are formed using at least one of the silicon-based active material particles (S50). The silicon-based active material particles including the silicon particles and a liquid organic compound including a carbon precursor are mixed to form a dispersion solution.

Then, the silicon particles dispersed in the dispersion solution are obtained again and dried to form solid secondary particles. The solid secondary particles are heat treated, and thereby the carbon matrix including the carbon precursor is carbonized so silicon-based secondary active material particles may be formed. These preparation methods are exemplary, and the present invention is not limited thereto.

In an embodiment, as the carbon precursor, any one selected from the group consisting of hydrocarbon-based compounds, alcohol-based compounds, ether-based compounds, and ester-based compounds, or a mixed solution of two or more thereof may be used. In an embodiment, the hydrocarbon may be hexene, nonene, dodecene, pentadecene, toluene, xylene, chlorobenzoic acid, benzene, hexadecyne, tetradecyne, or octadecyne. However, these compounds are exemplary, and other liquid hydrocarbons of linear or branched type having a carbon number in the range of 6 to 20 may be applied.

Additionally, the alcohol may be any one selected from ethyl alcohol, methyl alcohol, glycerol, propylene glycol, isopropyl alcohol, isobutyl alcohol, polyvinyl alcohol, cyclohexanol, octyl alcohol, decanol, hexadecanol, ethylene glycol, 1,2-octanediol, 1,2-dodecanediol, and 1,2-hexadecanediol, or a mixture thereof. As the alcohol-based organic solution, other primary alcohols, secondary alcohols, and tertiary alcohols may be used.

The ether may be cyclic ethers (e.g. octyl ether, butyl ether, hexyl ether, benzyl ether, phenyl ether, decyl ether, ethyl methyl ether, dimethyl ether, diethyl ether, diphenyl ether, tetrahydrofuran, 1,4-dioxane) and polyethers (e.g. polyethylene glycol (PEG), polypropylene glycol (PPG), polytetramethylene glycol (PTMG), polyoxymethylene (POM), polytetrahydrofuran). The above-described polyethers are exemplary, and other aliphatic or aromatic polyethers may be used as the ether-based organic solvent. The ester may be a cyclic ester (e.g. polyethylene terephthalate, acrylate esters and cellulose acetate, isobutyl acetate, isopropyl acetate, allyl hexanoate, benzyl acetate, bornyl acetate, butyl acetate, and lactone).

In another embodiment, as an additional carbon precursor for increasing the carbon-containing concentration, may further include any one among the carbon-containing natural and synthetic polymer materials that can be dissolved using the liquid organic compound as a solvent, or a mixture thereof. In yet another embodiment, any one among additional carbon-containing natural and synthetic polymer materials or a mixture thereof may be dissolved in a solvent other than the liquid organic compound such as water (e.g. distilled water or deionized water).

The carbon-containing polymer materials may be chitosan, glucose, sucrose, maltose, lactose, starch, glycogen, polystyrene (PS), polyethylene (PE), polypropylene (PP), polyvinyl chloride (PVC), polyacrylonitrile (PAN), polyethylene (PE), polyacrylic acid (PAA), polyvinylpyrrolidone (PVP), or a mixture thereof. For example, solid secondary particles may be obtained by dissolving the polymer materials (e.g. PAN, PAA, PVP, etc.) in an appropriate solvent, dispersing the silicon-based active material particles in the solvent, then obtaining intermediate particles wetted with the polymer material, followed by drying.

Hereinafter, the characteristics and advantages of the present invention will be described according to specific Experimental Examples selected from the above-mentioned materials and the composition ratios disclosed therefor in the Examples described above. The following disclosure is for illustrative purposes only and the present invention is not to be construed as limited thereto.

Experimental Examples

A commercially available polysilicon powder having an average diameter of about 5 μm was prepared and the polysilicon powder was dispersed in a solvent for dispersion, which contained 95 wt % of ethanol and respectively, 5 wt % of an antioxidant: alpha lipoic acid, octene, propyl gallate, tocopherol, glutathione, butyl hydroxyanisole, and phenol, and thereby a pre-pulverization mixture was prepared. A time-controlled mill pulverization process, which can apply compressive and shear stress to the pre-pulverization mixture, was repeated at least once and thereby the silicon-based active material particles were prepared. The amounts of the alpha lipoic acid and the ethanol used are values relative to 100 parts by weight (wt %) of silicon powder.

Comparative Example

A commercially available polysilicon powder having an average diameter of about 5 μm was prepared and the polysilicon powder was dispersed in a solvent for dispersion, which contained 100 wt % of ethanol, and thereby a pre-pulverization mixture was prepared. A time-controlled mill pulverization process, which can apply compressive and shear stress to the pre-pulverization mixture, was repeated at least once and thereby the silicon-based active material particles were prepared.

Battery Characteristic Tests

Battery characteristics were evaluated for samples containing silicon cathode active materials according to the Experimental Examples and Comparative Examples. The sizes of oxygen content (%), capacity to weight (mAh/g), and initial efficiency (%) were evaluated using half cells which were prepared using silicon negative electrode active material particles according to the Experimental Examples and Comparative Examples. The measured test data are shown in Table 1 below. In particular, the charging/discharging rate was 0.5 C. The reference initial capacity is 4,200 mAh/g, which is the theoretical capacity of silicon.

TABLE 1

|  |  | Antioxidant Sample | Oxygen Content (%) | Capacity to Weight (mAh/g) | Initial Efficiency (%) |
|---|---|---|---|---|---|
| Experimental Example 1 | Sample 1 | Alpha Lipoic Acid | 6.2% | 2554 mAh/g | 88.0% |
|  | Sample 2 | Octene | 6.3% | 2387 mAh/g | 87.6% |
|  | Sample 3 | Propyl Gallate | 7.6% | 2177 mAh/g | 84.4% |
|  | Sample 4 | Tocopherol | 7.5% | 2213 mAh/g | 84.7% |
|  | Sample 5 | Glutathione | 7.3% | 2234 mAh/g | 85.8% |
|  | Sample 6 | Butylated Hydroxyl Anisole | 8.1% | 2074 mAh/g | 82.1% |
|  | Sample 7 | Phenol | 7.8% | 2106 mAh/g | 83.5% |
| Comparative Example | Sample 8 | No addition | 13.4% | 1701 mAh/g | 78.5% |

Figure 5:
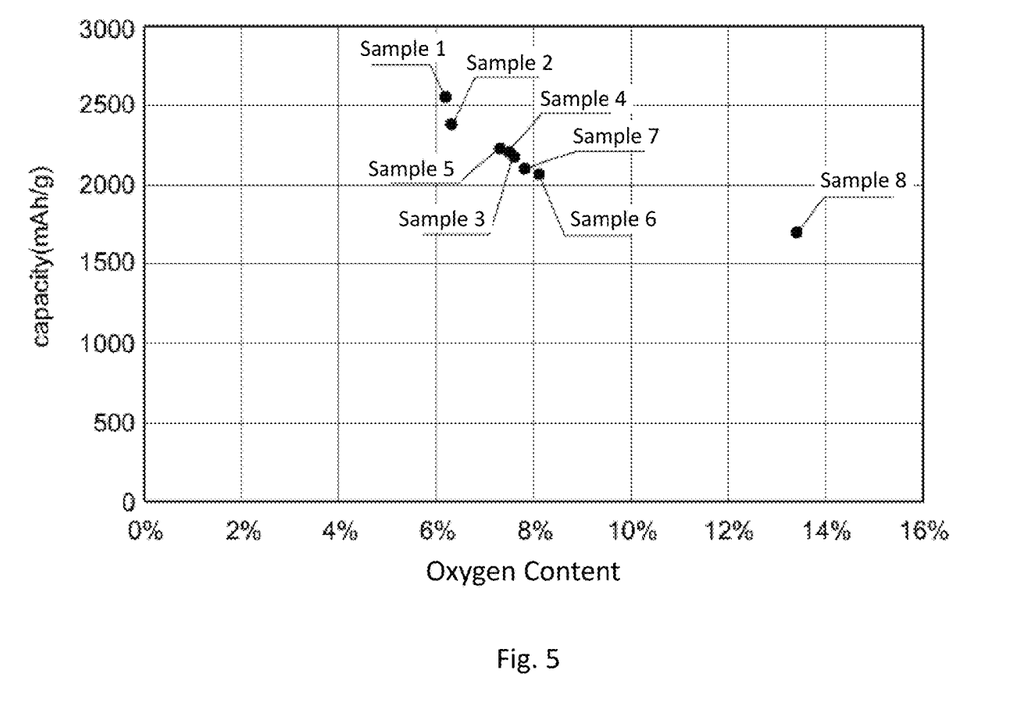
FIG. 5 is a graph evaluating the battery characteristics of the silicon-based active material particles samples according to the Examples and Comparative Examples of the present invention.

FIG. 5 is a graph evaluating the battery characteristics of the silicon-based active material particles samples according to the Examples and Comparative Examples of the present invention.

Referring to Table 1 and FIG. 5 together, it was confirmed that while the oxygen contents (%) of Experimental Example 1 (samples 1 to 7) were less than 10%, the oxygen content (%) of Comparative Example (in which the sample was prepared using a solvent for dispersion not containing an antioxidant) was higher than 10%. These results confirmed that the formation of an oxidative layer of the silicon-based active material particles was controlled by the antioxidant contained in the solvent for dispersion thereby reducing the oxygen content. Additionally, it was confirmed that as the oxygen content decreased, the capacity to weight and initial efficiency of silicon-based active material particles according to the Comparative Example were improved. From these results, it was confirmed that the process of dispersing silicon powder using the solvent for dispersion containing an antioxidant enabled an effect of improving lifetime in a battery, in which silicon-based active material particles were applied as a negative electrode active material.

According to an embodiment of the present invention, a method for preparing silicon-based active material particles may be provided, wherein during the preparation of the silicon-based particles excessive expansion of the core of the silicon particle during charging/discharging of the battery is prevented and subsequent micronization is prevented while stable formation of solid electrolyte interface (SEI) is induced, by controlling the oxygen content within the silicon particle by providing a pre-pulverization mixture, in which silicon powder is dispersed in a solvent for dispersion that includes an antioxidant, thus contributing to the improvement of the lifetime of the silicon-based active material particles.

Additionally, the formation of an oxide film may be controlled by a solvent for dispersion used in the process of granulating the silicon powder. As a result, a method for preparing a silicon-based active material particle with a long lifetime may be provided, by reducing the oxygen content in the active material and thereby improving the initial capacity of the battery and the battery efficiency.

The present invention described above is not limited to exemplary embodiments and accompanying drawings thereof, and it will be apparent to those skilled in the art that various substitutions, modifications, and changes can be made hereto without departing from the technical concept of the present invention defined in the following claims.

DESCRIPTION OF REFERENCE NUMERALS 100P, 200P: silicon-based active material particles
SC: silicon particles
PS: planar surface
CS: conductive layer
CO: chemical oxide layer
SEP: silicon-based active material complex
CM: carbon matrix

The invention claimed is:

1. A method for preparing silicon-based active material particles, the method comprising:
 a step of providing silicon powder;
 a step of providing a pre-pulverization mixture, in which the silicon powder is dispersed in a solvent for dispersion selected from the group consisting of water, deionized water, an alcoholic solvent, and a mixture of two or more thereof, the solvent further comprising an antioxidant;
 a step of applying mechanical compression and shear stress to the silicon powder of the pre-pulverization mixture to granulate the silicon powder, thereby forming a resulting product comprising silicon particles comprising a chemical silicon oxide layer formed on a core of a silicon particle by the solvent comprising the antioxidant, the silicon particles having an oxygen content controlled by the antioxidant; and
 a step of drying the resulting product comprising the silicon particles to remove the solvent comprising the antioxidant and obtain silicon-based active material particles.

2. The method of claim 1, wherein the antioxidant is selected from the group consisting of alpha lipoic acid, octene, propyl gallate, tocopherol, glutathione, butyl hydroxyanisole, butylated hydroxytoluene, tertiary butyl hydroquinone, nordihydroguaiaretic acid, sesamol, vitamin E, vitamin C, and quercetin.

3. The method of claim 1, wherein the antioxidant is used in an amount of 1 wt % to 10 wt % relative to the weight of the silicon powder.

4. The method of claim 1, wherein the solvent for dispersion comprises the alcoholic solvent and the alcoholic solvent comprises a member selected from the group consisting of ethyl alcohol, methyl alcohol, glycerol, propylene glycol, isopropyl alcohol, isobutyl alcohol, polyvinyl alcohol, cyclohexanol, octyl alcohol, decanol, hexadecanol, ethylene glycol, 1,2-octanediol, 1,2-dodecanediol, and 1,2-hexadecanediol, and mixtures thereof.

5. The method of claim 1, wherein the step of applying mechanical compression and shear stress is achieved by grinding, which performs pressing and abrasion while supplying the pre-pulverization mixture between a spinning abrasive plate and a fixed plate.

6. The method of claim 1, wherein the method further comprises:
 a step of mixing the resulting product comprising the silicon particles and a carbon precursor solvent to form a dispersion solution;
 a step of forming solid secondary particles, in which the silicon particles are dispersed within a carbon precursor matrix from the dispersion solution; and
 a step of heat treating the solid secondary particles to carbonize the carbon precursor matrix, thereby forming silicon-based secondary active material particles.

7. The method of claim 1 wherein, in the silicon-based active material particles, an oxygen content relative to a total weight of the cores of silicon particles and the chemical silicon oxide layers is limited to a range of 5 wt % to 15 wt % or 6 wt % to 10 wt %.

8. The method of claim 1, wherein the core of a silicon particle has a low crystallinity or is amorphous.

9. The method of claim 1, wherein an average particle diameter of the silicon-based active material particles is in the range of 30 nm to 300 nm or 30 nm to 200 nm.

10. The method of claim 1, wherein, in the silicon-based active material particles, an oxygen content relative to a total weight of the cores of silicon particles and the chemical silicon oxide layers is limited to a range of 6 wt % to 10 wt %.

* * * * *